(12) United States Patent
Charpentier et al.

(10) Patent No.: US 8,984,197 B2
(45) Date of Patent: Mar. 17, 2015

(54) POWER STACK CONTROL SYSTEMS

(71) Applicant: AgileSwitch, LLC, Philadelphia, PA (US)

(72) Inventors: Albert J. Charpentier, Malvern, PA (US); Robin L. Weber, Philadelphia, PA (US); Alan K. Smith, Phoenixville, PA (US)

(73) Assignee: AgileSwitch, LLC, Philadelphia, PA (US)

( * ) Notice: Subject to any disclaimer, the term of this patent is extended or adjusted under 35 U.S.C. 154(b) by 0 days.

(21) Appl. No.: 14/069,526

(22) Filed: Nov. 1, 2013

(65) Prior Publication Data
US 2014/0164668 A1    Jun. 12, 2014

Related U.S. Application Data

(60) Provisional application No. 61/735,714, filed on Dec. 11, 2012.

(51) Int. Cl.
*G06F 13/00* (2006.01)
*G06F 13/20* (2006.01)
*G06F 13/40* (2006.01)

(52) U.S. Cl.
CPC ................................. *G06F 13/4027* (2013.01)
USPC .......................................... 710/110; 710/313

(58) Field of Classification Search
CPC . H02M 2007/42; H02M 7/493; H04M 7/487; H01L 2924/13055; H01M 8/249; H04J 3/0638; H04J 3/0658; H04J 3/0685; H04J 3/0635; G06F 1/04

USPC .................................................. 710/110, 313
See application file for complete search history.

(56) References Cited

U.S. PATENT DOCUMENTS

| | | | | |
|---|---|---|---|---|
| 5,155,726 A * | 10/1992 | Spinney et al. | ............... | 370/296 |
| 5,682,328 A * | 10/1997 | Roeber et al. | ................. | 702/187 |
| 6,031,737 A * | 2/2000 | Green | ............................. | 363/37 |
| 6,611,524 B2 * | 8/2003 | Devanagondi et al. | .... | 370/395.5 |
| 6,911,790 B2 * | 6/2005 | Wood | ............................. | 315/291 |
| 7,321,291 B2 * | 1/2008 | Gidge et al. | .................. | 375/258 |
| 7,649,912 B2 * | 1/2010 | Balasubramanian et al. | | 370/509 |
| 7,668,153 B2 * | 2/2010 | Zavadsky | ...................... | 370/350 |
| 7,870,299 B1 * | 1/2011 | Sorensen et al. | .................. | 710/2 |
| 7,890,684 B2 * | 2/2011 | Berenbaum et al. | .......... | 710/110 |
| 2002/0049505 A1 * | 4/2002 | Heinemann et al. | ............ | 700/22 |
| 2003/0158706 A1 * | 8/2003 | Eidson | .......................... | 702/187 |
| 2008/0123790 A1 * | 5/2008 | Coln et al. | ..................... | 375/355 |
| 2012/0056662 A1 * | 3/2012 | Wilson et al. | ................. | 327/517 |
| 2012/0262218 A1 * | 10/2012 | Klaka et al. | .................... | 327/383 |

* cited by examiner

*Primary Examiner* — Paul R Myers
(74) *Attorney, Agent, or Firm* — RatnerPrestia

(57) ABSTRACT

The disclosed inventions relate to the field of power control electronics. More specifically the disclosed inventions pertain to Power Stack Control Systems which are used to control the generation of AC power from a DC or AC input voltage. The disclosed Power Stack Control Systems include a serial interface connection, the serial interface connection being in serial electrical communication with a plurality of power stacks, the plurality of power stacks comprising at least one interface board and at least one IGBT driver board, the at least one interface board being in parallel communication with at least one IGBT driver board.

18 Claims, 18 Drawing Sheets

Overview Master Event Buffer Operation

Overview Slave Event Buffer Operation

Power Electronics Control Overview – AgileSwitch Method

Power Electronics Control Overview – AgileSwitch Method

Power Electronics Control Overview – AgileSwitch Method

Serial Interface Control – Star Configuration

Serial Interface Control – Daisy Chain Configuration

Overview Master Event Buffer Operation

Overview Slave Event Buffer Operation

IGBT Control Packet Example

Overview of IEEE 1588 Clock Synchronization Process

IGBT Error Packet Example

IGBT Interrupt Packet Example

Slave Event Buffer Operation for One IGBT Trigger

| Pin | Signal | Pin | Signal |
| --- | --- | --- | --- |
| 1 | BOT-HB1-IN | 2 | GND |
| 3 | TOP-HB1-IN | 4 | GND |
| 5 | BOT-HB2-IN | 6 | GND |
| 7 | TOP-HB2-IN | 8 | GND |
| 9 | BOT-HB3-IN | 10 | GND |
| 11 | TOP-HB3-IN | 12 | GND |
| 13 | RESET | 14 | GND |
| 15 | Rx(+) | 16 | Rx(-) |
| 17 | FAULT | 18 | GND |
| 19 | Tx(+) | 20 | Tx(-) |
| 21 | GND | 22 | GND |
| 23 | VCC - Power | 24 | VCC - Power |
| 25 | VCC - Power | 26 | VCC - Power |

Serial Interface Cable Example 1

Figure 12

| Pin | Signal | Pin | Signal |
|---|---|---|---|
| 1 | BOT-HB1-IN | 2 | GND |
| 3 | TOP-HB1-IN | 4 | GND |
| 5 | BOT-HB2-IN | 6 | GND |
| 7 | TOP-HB2-IN | 8 | GND |
| 9 | BOT-HB3-IN | 10 | GND |
| 11 | TOP-HB3-IN | 12 | GND |
| 13 | RESET | 14 | GND |
| 15 | Rx(+) | 16 | Rx(-) |
| 17 | FAULT | 18 | GND |
| 19 | Tx(+) | 20 | Tx(-) |

| Pin | Signal | Pin | Signal |
|---|---|---|---|
| 1 | VCC - Power | 2 | VCC - Power |
| 3 | GND | 4 | GND |

Serial Interface Cable Example 2

Figure 13

| Pin | Signal | Pin | Signal |
|---|---|---|---|
| 1 | BOT-HB1-IN | 2 | GND |
| 3 | TOP-HB1-IN | 4 | GND |
| 5 | BOT-HB2-IN | 6 | GND |
| 7 | TOP-HB2-IN | 8 | GND |
| 9 | BOT-HB3-IN | 10 | GND |
| 11 | TOP-HB3-IN | 12 | GND |
| 13 | RESET | 14 | FAULT |

| Pin | Signal | Pin | Signal |
|---|---|---|---|
| 1 | Rx(+) | 2 | Rx(-) |
| 3 | GND | 4 | GND |
| 5 | Tx(+) | 6 | Tx(-) |
| 7 | GND | 8 | GND |

| Pin | Signal | Pin | Signal |
|---|---|---|---|
| 1 | VCC - Power | 2 | VCC - Power |
| 3 | GND | 4 | GND |

Serial Interface Cable Example 3

Figure 14

Serial Interface Cable Example 4

POWER STACK CONTROL SYSTEMS

CROSS-REFERENCE TO RELATED APPLICATIONS

This application claims benefit to Application No. 61/735,714, filed Dec. 11, 2012, "IGBT INTERFACE BOARDS WHICH ARE USED TO CONTROL THE GENERATION OF AC POWER FROM A DC OR AC INPUT VOLTAGE," the entirety of which is incorporated herein by reference for all purposes.

TECHNICAL FIELD

The disclosed invention is in the field of power control electronics. More specifically the disclosed invention pertains to Power Stack Control Systems which are used to control the generation of AC power from a DC or AC input voltage.

BACKGROUND OF THE INVENTION

Power Stack Control Systems are used to control the generation of AC power from a DC or AC input voltage. Modern Power Stack Control Systems incorporate one or more transistors, for example an insulated-gate bipolar transistor (IGBT). An IGBT is a three-terminal power semiconductor device primarily that forms an electronic switch for combining high efficiency and fast switching in electric devices. Power Stack Control System 100 as known in the prior art is depicted in FIG. 1 and includes an IGBT interface board (108) connected to an IGBT Driver Board (112) via connection 110, a Master Control Unit Board (104), a Host CPU board (not shown) connected to Master Control Unit Board (104) via connection 102, and IGBT (116) connected to IGBT Driver Board (112) via connection 114. The IGBT interface board (108), IGBT Driver Board (112) and IGBT (116, with DC input 118 and AC output 120) are also referred to as the Power Stacks (108, 112, 116).

Known Power Stacks (108, 112, 116) are currently driven by a Master Control Unit (104) which is usually a standalone embedded control board. Typical Master Control Units (104) currently use a parallel interface (106) via a ribbon cable which enables direct control of the IGBT Interface boards (108) which interface directly to the IGBT driver boards (112). Both the IGBT Interface (108) and Driver boards (112) are individual components of the power stack.

There are a few problems with the existing parallel interface (106) scheme as implemented on the ribbon cable:

1. The power and grounds supplied on the cable do not adequately support the power and grounding requirements of the IGBT Interface and Driver boards (108, 112).

2. The digital logic level implemented on the parallel interface (106) is not an industry standard which complicates the application interface to digital logic components on the Interface Board (108).

3. Due to the limited number of pins on the parallel interface (106) it is not possible to provide adequate status/error information back to the Master Control Unit (104).

4. The existing interface does not support control of multiple IGBT Interface boards (108) or multiple power stacks in general (108, 112, 116).

5. The existing interface does not support the concept of a global clock which can be used to control timing between the Master Control Unit and the Power Stack (108, 112, 116) with a high degree of precision.

Thus, there is a need for new Power Stack Control Systems that addresses these problems. The invention is directed to these and other important needs.

SUMMARY OF THE INVENTION

The present invention provides Power Stack Control Systems, comprising: a serial interface connection, the serial interface connection being in serial electrical communication with a plurality of power stacks, the plurality of power stacks comprising at least one interface board and at least one IGBT driver board, the at least one interface board being in parallel communication with at least one IGBT driver board.

The general description and the following detailed description are exemplary and explanatory only and are not restrictive of the invention, as defined in the appended claims. Other aspects of the present invention will be apparent to those skilled in the art in view of the detailed description of the invention as provided herein.

BRIEF DESCRIPTION OF THE DRAWINGS

The summary, as well as the following detailed description, is further understood when read in conjunction with the appended drawings. For the purpose of illustrating the invention, there are shown in the drawings exemplary embodiments of the invention; however, the invention is not limited to the specific methods, compositions, and devices disclosed. In addition, the drawings are not necessarily drawn to scale. In the drawings:

FIG. 12 provides an example of one serial interface cabling pinout option which uses a 26 pin ribbon cable (1216).

FIG. 13 provides an example of a second serial interface cabling pinout option which uses a 20 pin ribbon cable (1314) and a 4 pin power cable (1320).

FIG. 14 provides an example of a third serial interface cabling pinout option which uses a 14 pin ribbon cable (1410), an 8 pin CAT5, CAT6 etc. type cable (1420) and a 4 pin power cable (1426).

DETAILED DESCRIPTION OF ILLUSTRATIVE EMBODIMENTS

Figure 1:
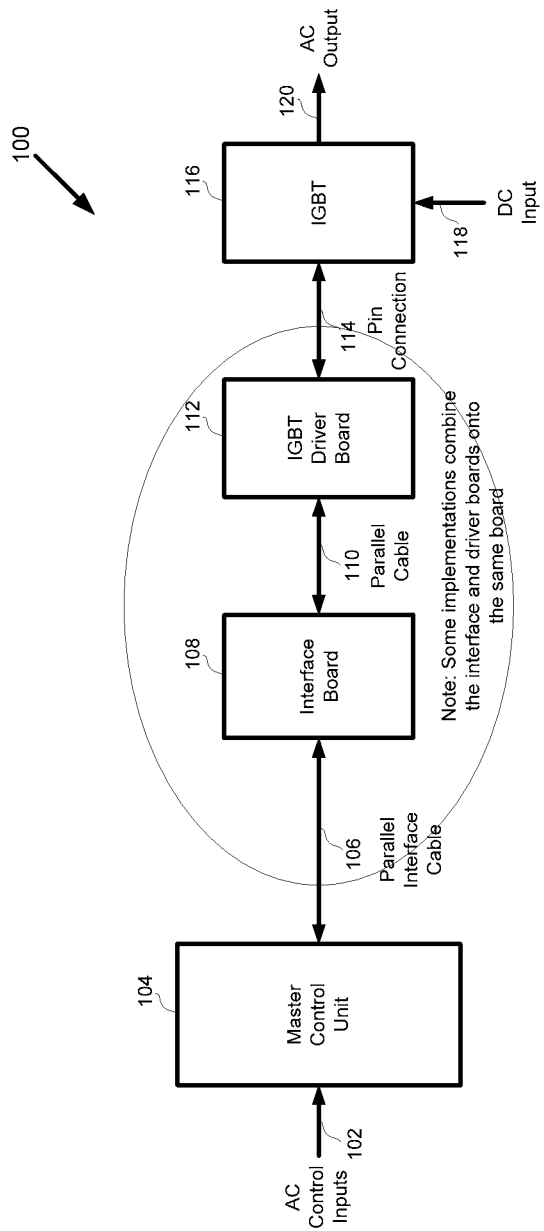
FIG. 1 describes an overview of the Prior Art.

The present invention may be understood more readily by reference to the following detailed description taken in connection with the accompanying figures and examples, which form a part of this disclosure. It is to be understood that this invention is not limited to the specific devices, methods, applications, conditions or parameters described and/or shown herein, and that the terminology used herein is for the purpose of describing particular embodiments by way of example only and is not intended to be limiting of the claimed invention. Also, as used in the specification including the appended claims, the singular forms "a," "an," and "the" include the plural, and reference to a particular numerical value includes at least that particular value, unless the context clearly dictates otherwise. The term "plurality", as used herein, means more than one. When a range of values is expressed, another embodiment includes from the one particular value and/or to the other particular value. Similarly, when values are expressed as approximations, by use of the antecedent "about," it will be understood that the particular value forms another embodiment. All ranges are inclusive and combinable.

It is to be appreciated that certain features of the invention which are, for clarity, described herein in the context of separate embodiments, may also be provided in combination in a single embodiment. Conversely, various features of the invention that are, for brevity, described in the context of a single embodiment, may also be provided separately or in any subcombination. Further, reference to values stated in ranges include each and every value within that range.

Suitable Power Stack Control Systems as described herein include the components of a system that are used to control the generation of power, including a Master Control Unit, an Interface Board, an IGBT Driver board, an IGBT, and any desired electrical connections.

As used herein, "Power Stack" refers to an industry-recognized term which can refer to Interface Board, IGBT Driver Board, IGBT, Metal case, Capacitor bank, and cooling options. A Power Stack may have a combined Interface and Driver Board.

As used herein, "IGBT" refers to a transistor switch which can switch an input voltage to the output in the Power Stack. Switching of IGBTs can be controlled by a suitable Master Control Unit.

As used herein, "IGBT Driver Board" refers to a board that can be used to directly drive an IGBT. An IGBT Driver board can include translation circuitry to drive and protect the IGBT. An IGBT Driver Board may be combined with an Interface Board.

As used herein, "Interface Board" refers to a board used to provide an interface between a Master Control Unit and an IGBT Driver Board circuitry. The Interface Board typically includes translation circuitry between Master Control Unit and IGBT Driver board, protection circuitry and any other circuits desired to translate information between the Main Control Unit and IGBT Driver board(s). Interface Boards may be combined with an IGBT Driver Board.

As used herein, "Parallel Interface" refers to an electronic interface which include a separate wire in a cable bundle dedicated to one particular function (for example power supply, ground, control signal, error signal, status signal). Parallel interfaces typically require many individual wires depending on the system interface complexity.

As used herein, "Serial Interface" refers to an electronic interface which is implemented as a transmit/receive function using either a single wire each for transmit and receive (e.g., a single ended serial interface) or two wires each for transmit and receive (e.g., a differential serial interface). Suitable differential interfaces typically use a plus (+) and minus (−) wire pair, has more noise immunity and is able to span longer distances as compared to the single ended serial interface. Serial interfaces typically reduce the number of wires required to interface two system components and typically use packet structures to transmit and receive data serially (e.g., one bit at a time).

Suitable Power Stack Control Systems described herein include a serial interface connection, the serial interface connection being in serial electrical communication with a plurality of power stacks, the plurality of power stacks comprising at least one interface board and at least one IGBT driver board, the at least one interface board being in parallel communication with at least one IGBT driver board. Power can be supplied to the Power Stack Control System through any suitable source of power, such as a power cable that provides electric power to at least one power stack.

Suitable serial interface connections can include a serial interface supporting one or more of the following serial interface standards: RS232, RS422, RS485, Ethernet, PCIe, Firewire and USB.

In various embodiments of the Power Stack Control Systems, the plurality of power stacks may further include at least one IGBT in electrical communication with an IGBT driver board. Electrical communication can be provided by the IGBT driver board being soldered, screwed down or any other electrical means to an IGBT through an electrically conductive connection.

Other configurations of the Power Stack Control System are also possible such as a star or daisy chain configuration. For example, a plurality of individual serial interface connections and a plurality of individual interface boards can be connected in a star configuration, wherein each of the individual serial interface connections is in serial electrical communication with each of the individual interface boards, wherein each of the individual interface boards are capable of being in parallel communication with an individual IGBT driver board. As well, a plurality of individual serial interface connections and a plurality of individual interface boards can be connected in a daisy chain configuration, wherein two of the individual serial interface connections is in serial electrical communication with two of the individual interface boards, the two interface boards further being in serial electrical communication with one other interface board, and optional additional individual serial interface boards being in serial communication with two other interface boards, wherein each of the individual interface boards are capable of being in parallel communication with an individual IGBT driver board.

In certain embodiments, the Power Stack Control Systems can have one or more of the component power stacks comprising a local (slave) clock to support clock synchronization with a master clock.

Suitable serial interface connections of the Power Stack Control Systems can support varying serial data packet structures for control information sent by a Master Control Unit to one or more of the power stacks. For example, the varying serial data packet structures can encode status/error information sent by one or more of the power stacks to a Master Control Unit. Accordingly, the varying serial data packet structures can be transmitted at fixed sample rates, or variable sample rates, or both by the Master Control Unit.

Suitable serial interfaces are also capable of being connected to a network to provide remote access to a user to control, to monitor the status of, or both, one or more of the power stacks or the entire Power Stack Control System. As used herein, a suitable network can include a local area network (LAN), a wide area network (WAN), or the Internet, and the serial interface is capable of connecting to the network wirelessly, wired, or optically. Different types of network connections are possible, e.g., WiFi, MaxFi, 4G wireless, DSL, etc. Preferable network connections include WiFi, MaxFi, 4G wireless, DSL, 3G wireless, Ethernet wired 10/100/1000 Mbits, 10 Gbits, and Ethernet wireless (A, B, G, N, etc.). Ethernet optical is also a suitable network connection, for example FIOS for a wide area connections or standard Ethernet Optical for Local area network.

As described further herein, the Power Stack Control Systems described can further have a number of different features. For example, one or more of the Power Stack Control Systems can be capable of data logging to support failure analysis of the one or more power stacks, or preemptive maintenance for potentially failing power stacks, or both. Another feature is that an IGBT interface can comprise a microprocessor, a field programmable gate array (FPGA), or both, to provide a real time communication interface with a Master Control Unit.

In related embodiments, the Power Stack Control Systems may further include a Master Control Unit in serial communication with the interface board via the serial interface connection. Suitable Master Control Units include a master clock, and one or more of the power stacks which include a local (slave) clock to support clock synchronization with the master clock. In these embodiments the serial interface connection can be characterized as being full duplex mode. Full duplex allows simultaneous transmit and receive connections. This can be useful when it is desired to send trigger information to the Power Stack via the serial interface as this information transfer will not be interrupted by, or interfere with, the status/error information being sent from the Power stack. Half duplex can be used in applications where the triggers are not sent to the Power stack using the serial interface connection.

In the embodiments including a Master Control Unit, the serial interface connection can also support varying serial data packet structures for controlling information sent by the Master Control Unit to one or more of the power stacks. For example, the varying serial data packet structures encode status/error information sent by any one of the power stacks to the Master Control Unit. Accordingly, the varying serial data packet structures can be transmitted at fixed sample rates, or variable sample rates, or both by the Master Control Unit to the one or more power stacks. As well one or more of the power stacks can be capable of data logging to support failure analysis of the one or more power stacks, or preemptive maintenance for potentially failing power stacks, or both. Additionally, the IGBT interface in these embodiments can include a microprocessor, a field programmable gate array (FPGA), or both, to provide a real time communication interface with the Master Control Unit.

Figure 2A:
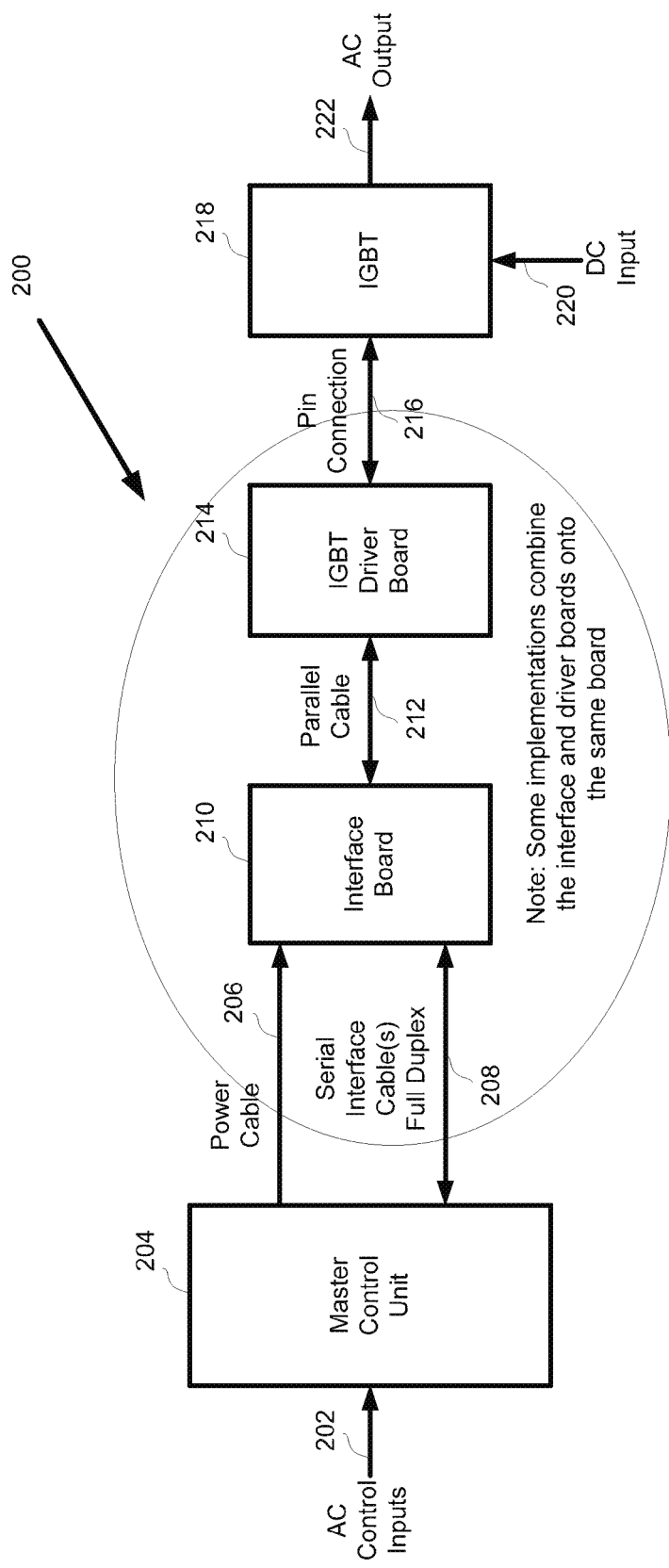
FIG. 2 (A,B,C) shows an overview of the present invention. The present invention applies to all components in a Power Stack Control System (204, 210, 214, 218) in any combination and is not dependent on the specific implementation (for example a combined Interface/Driver board vs. separate Interface and Driver boards).
Figure 2B:
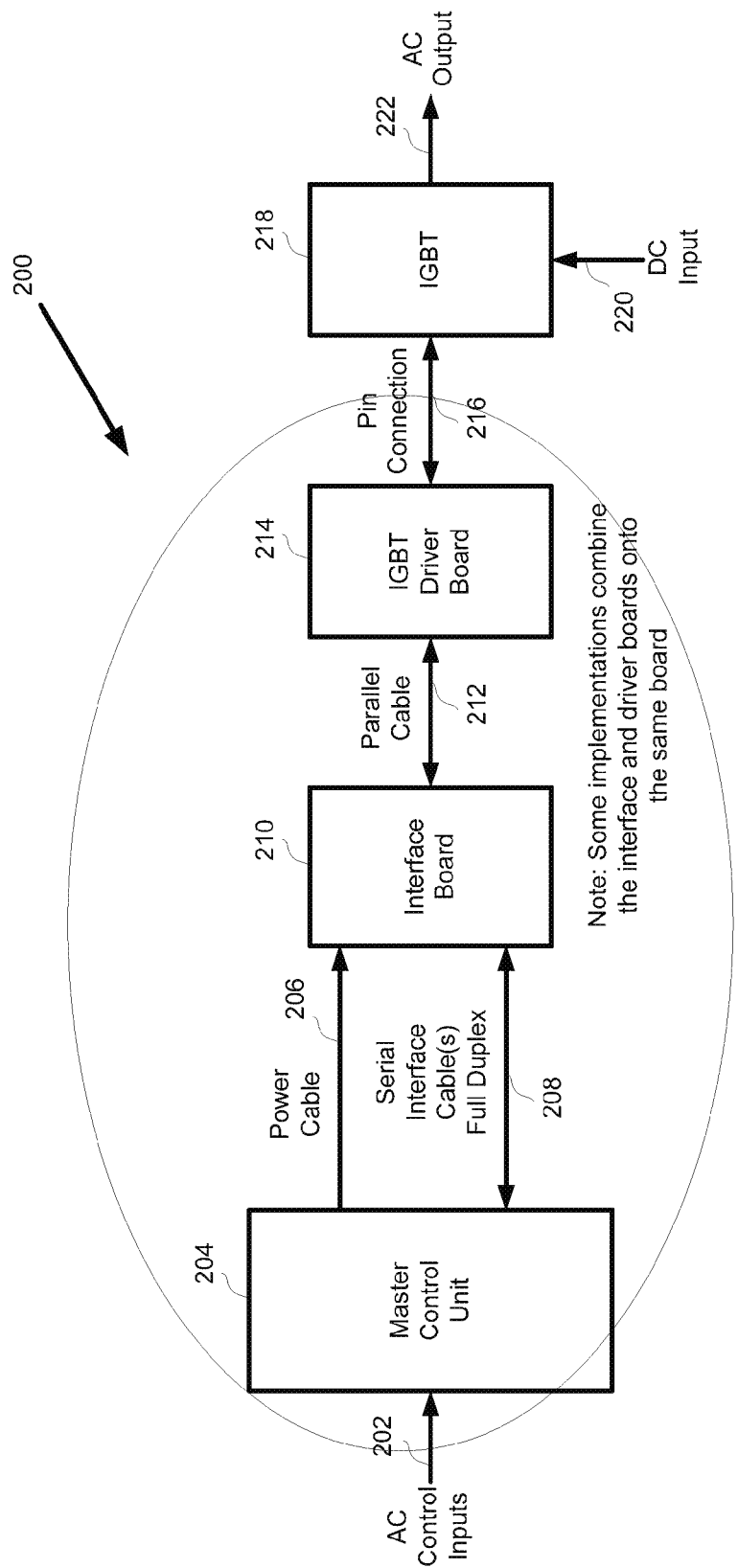
Figure 2C:
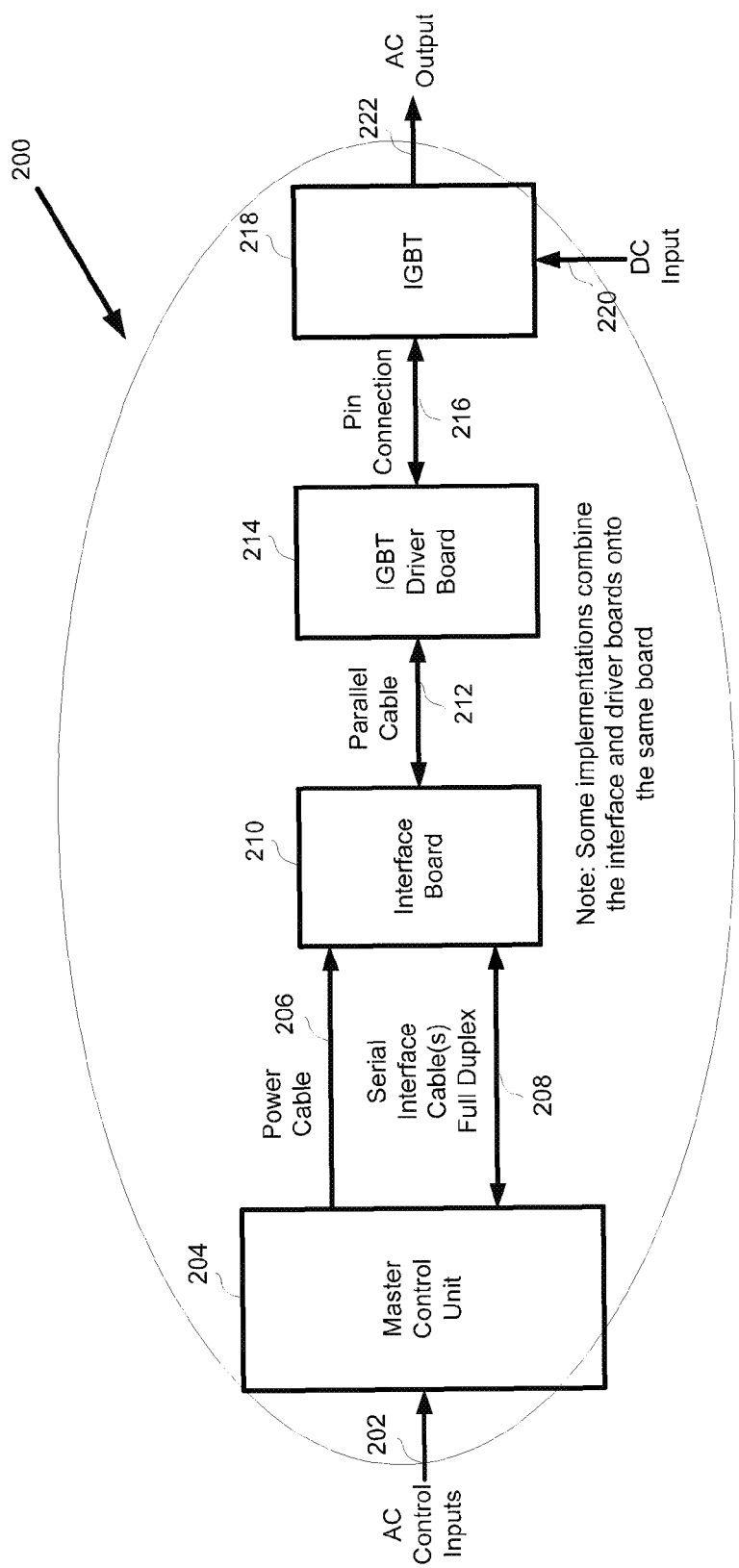

Referring to FIGS. 2A, 2B and 2C, there are described Power Stack Control System 200 as disclosed herein which includes a serial interface cable (208) with multiple cabling options. In addition support for a precision time protocol which can be used to introduce the concept of a global clock time into the Power Stack Control System (204, 210, 214, 218) over the serial interface. A few examples of the serial interface cable (208) options are explained and discussed below in FIGS. 12 to 15. A parallel interface cable may be used to connect IGBT Interface Board 210 and IGBT Driver Board 214. Master control unit 204 may have AC control inputs 202. IGBT 218 may have DC input 220 and AC output 222.

1. A 26 pin ribbon cable (1216) which is currently in use with the pin connections redefined to include a serial interface which can support full duplex mode to transmit control information and receive status/error information within the Power Stack Control System and improved power connections. Refer to FIG. 12. The serial interface is implemented on pins 15 and 16 for receive (1206) and pins 19 and 20 for transmit (1210).

2. A separate Power supply cable (1320) and a 20 pin ribbon cable (1314) which can support full duplex mode to transmit control information and receive status/error information within the Power Stack Control System as well as separate IGBT trigger signals. Refer to FIG. 13. The serial interface is implemented on pins 15 and 16 for receive (1306) and pins 19 and 20 for transmit (1310).

3. A separate Power supply cable (1426), a 14 pin ribbon cable (1410) which can support the IGBT Trigger signals including a global Fault status and Reset signals and a CAT5, CAT6 etc. cable (1420) which can support full duplex mode to transmit control information and receive status/error information within the Power Stack Control System. Refer to FIG. 14. The serial interface is implemented on pins 1 and 2 for receive (1412) and pins 5 and 6 for transmit (1416).

Figure 15:
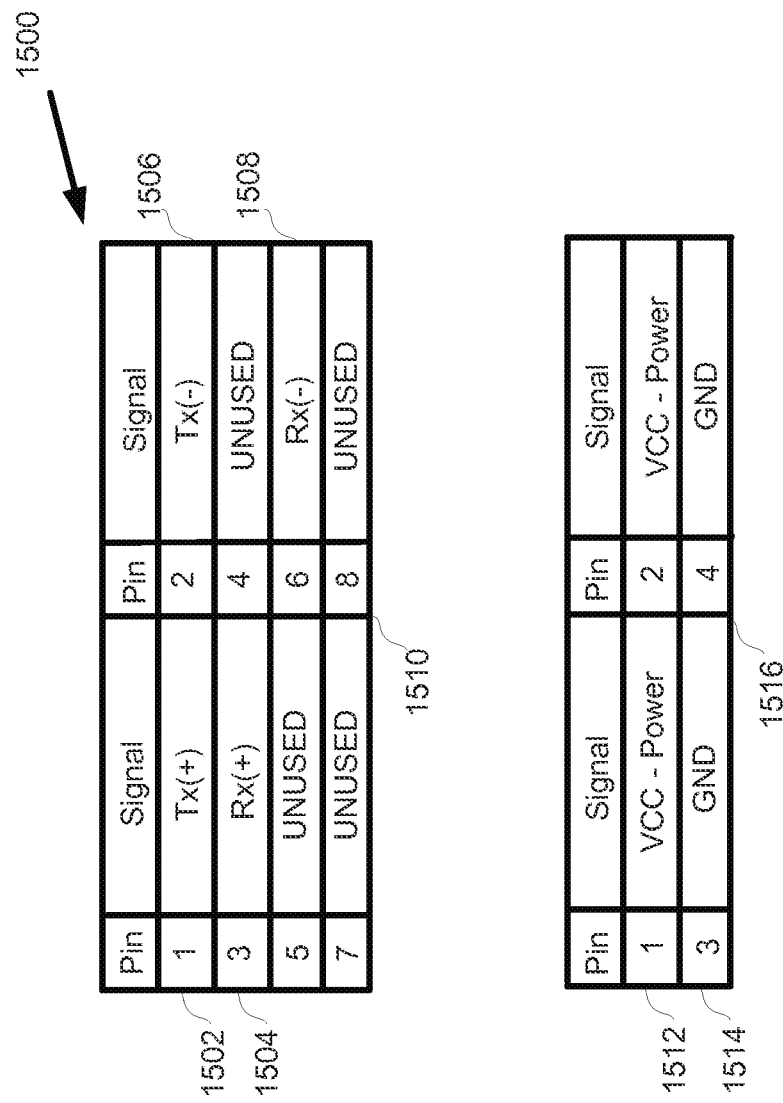
FIG. 15 provides an example of a fourth serial interface cabling pinout option which uses an 8 pin CAT5, CAT6 etc. type cable (1510) and a 4 pin power cable (1516).

4. A standard Ethernet CAT5, CAT6 etc. serial interface cable (1510) and a separate Power supply cable (1516). The standard Ethernet CAT5, CAT6 etc. type cable (1510) can support all control and status functions including IGBT Triggers, all status reporting, Reset etc. Refer to FIG. 15. The serial interface is implemented on pins 1 and 2 for transmit (1502, 1506) and pins 3 and 6 for receive (1504, 1508).

In addition programmable logic can be added to the IGBT interface board (210) such that it can be able to be field upgradable to support updates and/or new features. This programmable logic may take the form of an embedded microprocessor, a Field Programmable Gate Array (FPGA) or both. Programmable logic can also allow for customization of the interface board (210) based on different application requirements.

By switching to a serial interface, control and status/error information can be packetized and support varying levels of complexity depending on the specific requirements of the application. In addition the serial interface cable can also support embedded clock/timing information which can allow multiple IGBT interface boards (210) or Power Stacks (210, 214, 218) in general to be synchronized to a master system clock (global clock) that can be provided by the Master Control Unit (204).

The present invention provides a serial interface cable with multiple cabling options. In addition support for a precision time protocol which can be used to introduce the concept of a global clock time into the Power Stack Control System over the serial interface. A few examples of the serial interface cabling options are explained below and shown in FIGS. 12-15:

1. A 26 pin ribbon cable (1216) which is currently in use with the pin connections redefined to include a serial interface which can support full duplex mode to transmit control information and receive status/error information within the Power Stack Control System and improved power connections. Refer to FIG. 12. The serial interface is implemented on pins 15 and 16 for receive (1206) and pins 19 and 20 for transmit (1210).

2. A separate Power supply cable (1320) and a 20 pin ribbon cable (1314) which can support full duplex mode to transmit control information and receive status/error information within the Power Stack Control System as well as separate IGBT trigger signals. Refer to FIG. 13. The serial interface is implemented on pins 15 and 16 for receive (1306) and pins 19 and 20 for transmit (1310).

3. A separate Power supply cable (1426), a 14 pin ribbon cable (1410) which can support the IGBT Trigger signals including a global Fault status and Reset signals and a CAT5, CAT6 etc. cable (1420) which can support full duplex mode to transmit control information and receive status/error information within the Power Stack Control System. Refer to FIG. 14. The serial interface is implemented on pins 1 and 2 for receive (1412) and pins 5 and 6 for transmit (1416).

4. A standard Ethernet CAT5, CAT6 etc. serial interface cable (1510) and a separate Power supply cable (1516). The standard Ethernet CAT5, CAT6 etc. type cable (1510) can support all control and status functions including IGBT Triggers, all status reporting, Reset etc. Refer to FIG. 15. The serial interface is implemented on pins 1 and 2 for transmit (1502, 1506) and pins 3 and 6 for receive (1504, 1508).

In addition programmable logic can be added to the IGBT interface board (210) such that it can be able to be field upgradable to support updates and/or new features. This programmable logic may take the form of an embedded microprocessor, a Field Programmable Gate Array (FPGA) or both. Programmable logic can also allow for customization of the interface board (210) based on different application requirements.

By switching to a serial interface, control and status/error information can be packetized and support varying levels of complexity depending on the specific requirements of the application. In addition the serial interface cable can also support embedded clock/timing information which can allow multiple IGBT interface boards (210) or Power Stacks in general to be synchronized to a master system clock (global clock) that can be provided by the Master Control Unit (204).

Serial Interface.

FIG. 2 (A, B, C) shows an overview of various embodiments of the present invention. These drawings depict inter alia a Power cable (206) and a Full Duplex Serial Interface cable (208).

The serial interface cable (208) can be used to transfer control and status/error information to/from the Power Stack. The serial interface implementation can be offered in varying levels of complexity and temperature ranges depending on application requirements. For example, two different Serial Interface options may include:

1) RS422 Full Duplex Interface
2) Ethernet Full Duplex Interface

Other potential Serial Interface options include USB or potentially any other serial interface standard (RS232/RS485).

Either serial interface option can support single or multiple power stack applications and they may also support star (300) or daisy chain (400) interconnect configurations. In addition either serial interface option can support master to local (slave) clock synchronization between the Master Control Unit (204) (master (global) clock) and the Power Stack's local (slave) clock.

Figure 3:
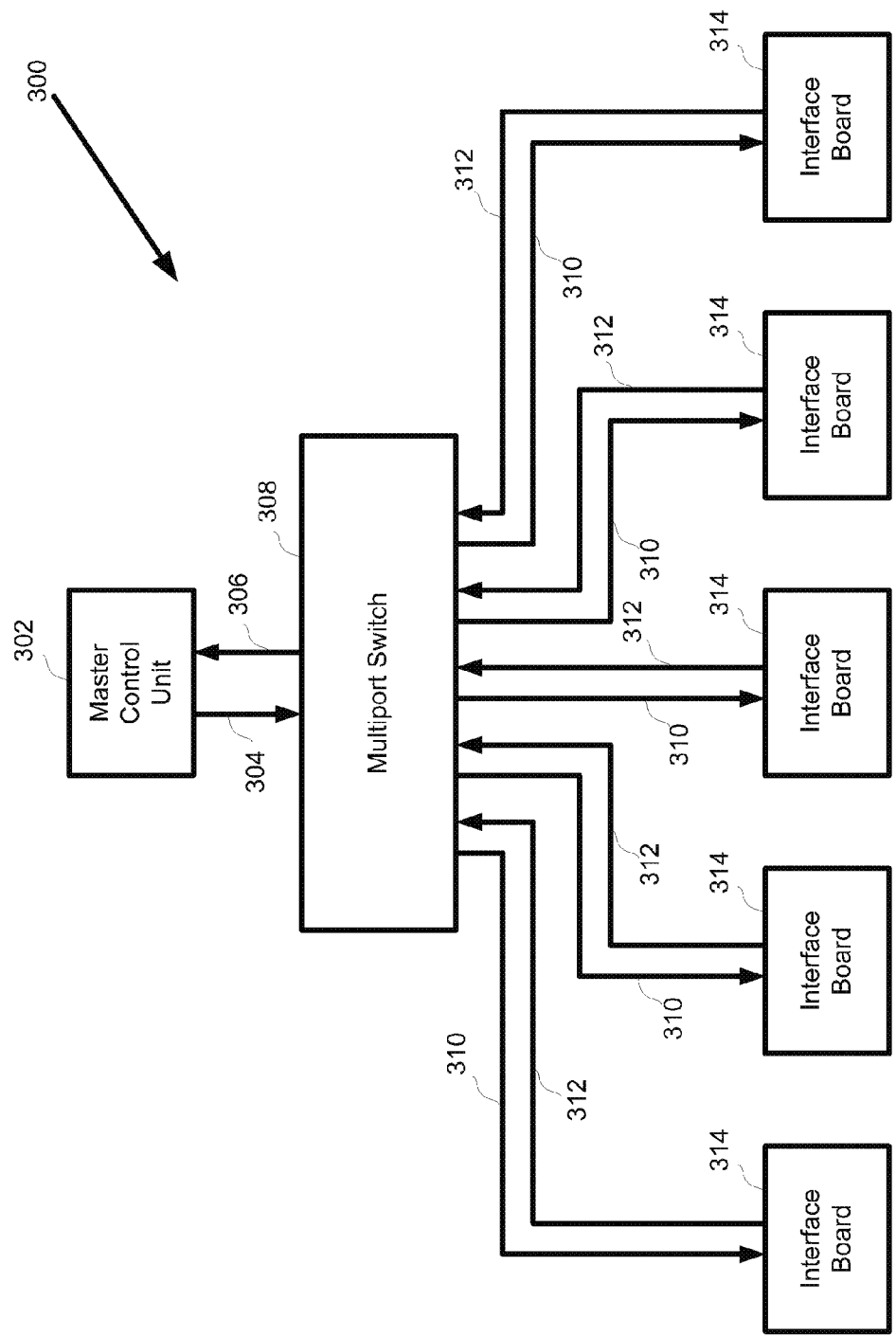
FIG. 3 depicts a serial interface star configuration where the Master Control Unit (302) drives a multiport switch unit (308) which in turn drives the individual interface boards (314) or more generally the Power Stack Control System.

FIG. 3 shows a serial interface star configuration (300) where the Master Control Unit (302) drives a multiport switch unit (308) which in turn drives the individual interface boards (314) (or more generally the Power Stack Control System). The multiport switch unit's (308) function can depend on the type of serial interface used.

For a serial interface implementation such as RS422 the multiport switch (308) can simply replicate the transmit input from the Master Control Unit (302) to any number of output ports to the interface boards (314) (or more generally the Power Stack Control System). For the receive ports it can multiplex the receiver inputs from the interface boards (314) (or more generally the Power Stack Control System) back to the Master Control Unit (302).

For an Ethernet serial interface scheme, the multiport switch (308) can be an Ethernet Switch. It can also replicate the transmit input from the Master Control Unit (302) to any number of output ports to the interface boards (314) (or more generally the Power Stack Control System). And for the receive ports it can multiplex the receiver inputs from the interface boards (314) (or more generally the Power Stack Control System) back to the Master Control Unit (302). For Ethernet this is a standard function of the switch (308). An RS422 implementation can be provided as well.

The implementation of a serial interface can also support a clock synchronization scheme which can keep the Power Stacks local (slave) clock synchronized to a master (global) clock located in the Master Control Unit (204). This clock synchronization can support varying levels of accuracy and can depend on specific requirements of the power system. Higher levels of clock synchronization accuracy can allow more accurate control of the real time power generation, conversion and/or control process.

Suitable clock synchronization schemes may be the IEEE 1588 Precision Time Protocol, or the IEEE 802.1AS Precision Time Protocol. Other suitable time protocols are also possible.

Figure 4:
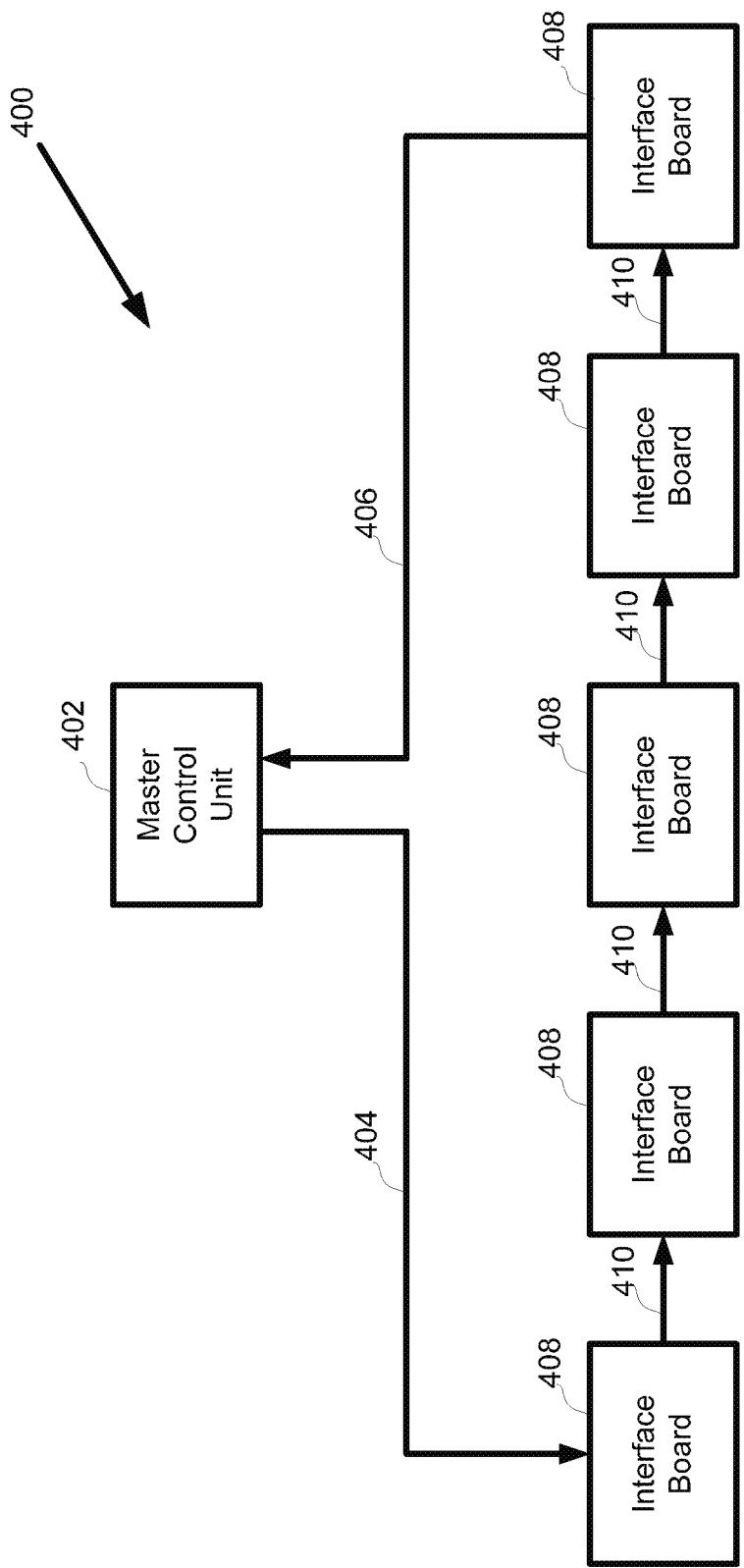
FIG. 4 depicts the serial interface daisy chain configuration where the Master Control Unit (402) drives the first interface board (408) (or more generally the Power Stack Control System) in the chain which then pass's the Master Control Units' (402) control information along with its status/error information to the next interface board (408) in the chain or more generally the next Power Stack Control System in the chain.

FIG. 4 shows the serial interface daisy chain configuration (400) where the Master Control Unit (402) drives the first (left-most) interface board (408) (or more generally the Power Stack Control System) in the chain which then passes the Master Control Units' (402) control information along with its status/error information to the next (on the right) interface board (408) in the chain, and so on. The last (right-most) interface board (408) in the chain can forward all previous interface board's (408) status/error information back to the Master Control Unit (402). The status/error information of the serial interface daisy chain configuration can then be transmitted or displayed to one monitoring the system.

Figure 6:
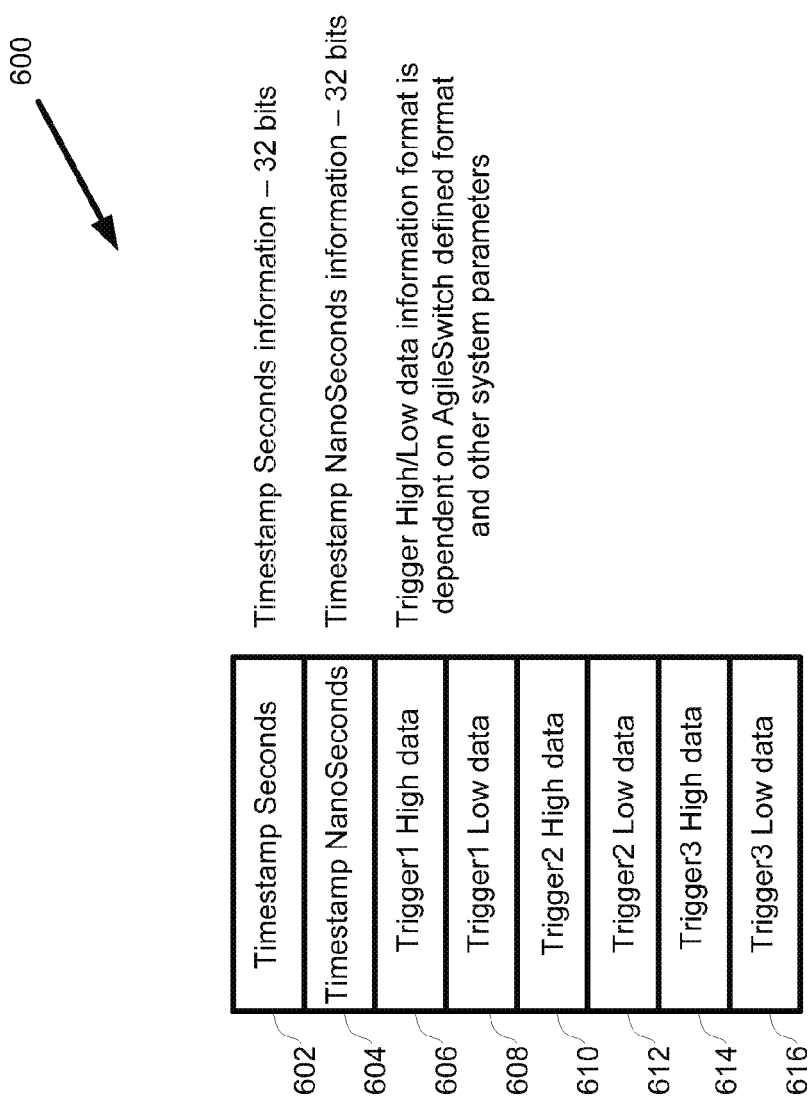
FIG. 6 provides an example of a Control packet. Note: This packet data represents the user (application) data portion of the packet. This would be the data payload portion of an Ethernet (or USB) packet which would also include the standard Ethernet (USB) packet header information. In the case of other serial interface implementations (RS232, RS422 etc.) AgileSwitch would design our own custom packet header information.

Either serial interface implementation can support both control and status/error data packets. The structure and contents of these packets can vary depending on the application requirements and implementation. Refer to FIG. 6 for an example of a control packet, FIG. 7 for an example of a status packet, FIG. 9 for an example of an error packet, and FIG. 10 for an example of an interrupt packet. Refer to FIGS. 12, 13, 14 and 15 for examples of Serial cable implementations and pinouts.

Figure 5A:
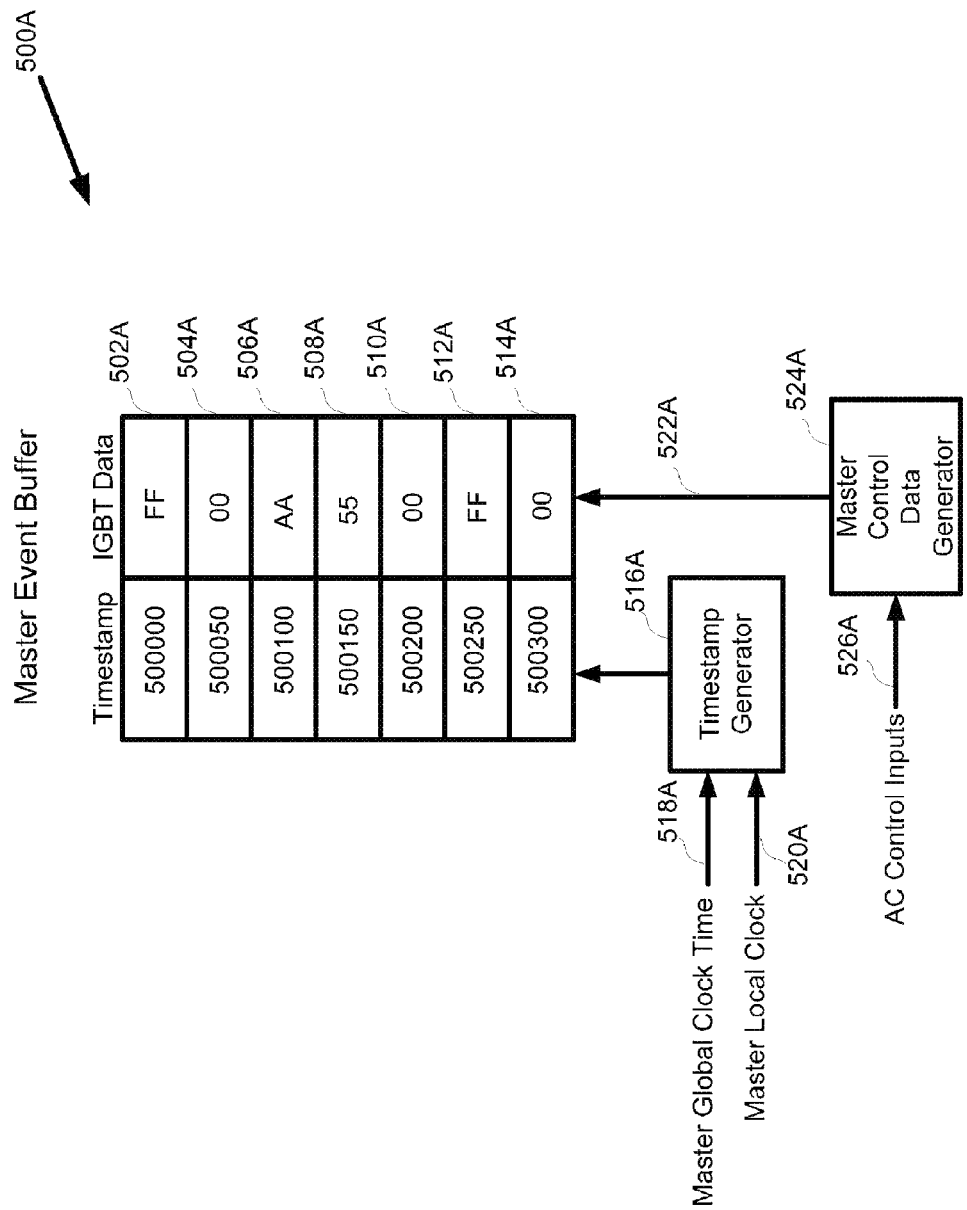
FIG. 5 (A, B) provides an overview of a master and slave event buffer operation when using a global synchronized clock.

The serial interface packets typically include a global clock timestamp (seconds and nanoseconds) for marking the time of the various control/status packets. The Master Control Unit (204) and the Power Stacks are typically synchronized to a global clock time including the global clock timestamp into the control and status packets. This allows precise control and monitoring of all functions by the Master Control Unit. FIGS. 5A and B presents an overview of the Master (Master Control Unit (204)) and Slave (Power Stack) operation. The Master Control Unit (204) stores control information (IGBT Trigger on/off) into the Master Event buffer (500A). The Master Event Buffer (500A) is the data source for the transmit packets from the Master Control Unit (204). The Slave (Power Stacks) maintains a Slave Event buffer (500B) which contains the data transmitted from the Master Control Unit (204). Both the Master and Slave Event buffers (500A, 500B) track the global clock timestamp. The Slave (Power Stack) can output the control data received from the Master Control Unit (204) when its local (Slave) global clock timestamp matches the global clock timestamp recorded in the Slave Event buffer (500B) as received from the Master Control Unit (204). The Slave Event buffer operation is outlined in more detail in FIG. 11, which shows a Timestamp Comparator Controller (1120) monitoring the timestamps recorded in the Slave Event buffer (1102) and comparing these timestamps to its local (Slave) global clock time (1118). When a timestamp match occurs it can begin outputting the data from the Slave Event buffer (1102) for that timestamp. In the example the data AAAAA (hexadecimal format) can be output one bit at a time to a particular IGBT Driver (1126) once the global clock timestamp reaches 500000 (1104). The data pattern AAAAA (hexadecimal format) represents 20 individual IGBT Driver (1126) trigger values with each individual trigger occurring at 1 microsecond intervals.

In this example the data is labeled trigger 1 for controlling an IGBT driver (1126). This data could also be used to control anything which requires precise control within the Power Stack Control System.

Clock Synchronization.

The main concept behind the clock synchronization scheme is that the master and all slave devices have a clock which is synchronized to the same time with some specified degree of accuracy. This global clock time is the same concept as a regular wall clock with the only difference being the time units. For a wall clock the time units can be hours, minutes and seconds. For various embodiments (including the use of the IEEE Precision Time Protocols) the units can be seconds and nanoseconds which allow for a greater degree of clock synchronization between the master and slave devices. This greater degree of accuracy in the global time units can also allow for a greater degree of accuracy for both the control and status packets. This scheme provides a greater degree of accuracy in the control and monitoring of the power stacks and in the power generation, conversion and/or control process.

A suitable Master clock device can be the Master Control Unit (204) and the Slave(s) can be the Power Stack(s) In the IEEE 1588 protocol the master clock is first dynamically selected from all of the devices on the network which support the precision time protocol. The master device is then responsible for generating the master (global) clock time and the slave devices synchronize themselves to this global clock time using a specific protocol that begins at the power on initialization time of the devices. The clock synchronization protocol is fully described in the IEEE 1588 Precision Time Protocol specification but briefly clock time synchronization to the master is accomplished in two steps (refer to FIG. 8).

The communication path delay is computed by the slave device (806). This is done by recording timestamps generated when IEEE 1588 packets (Path Delay Request (808), Path Delay Response (814) and Path Delay Response FollowUp (820)) are transmitted between the master (804) and slave device (806).

The slave clock offset is computed by the slave device (806). This is accomplished through the use of timestamps generated when the master device (804) sends Sync frames (828). The master device (804) can send Sync frames (828) at a specific time interval which is normally one second. The timestamps sent in the Sync frames (828), Sync FollowUp frames (832) and the communication path delay (822) can be used to calculate the offset between the master and slave clock counters. The clock offset (834) is then used to adjust the slaves clock counter increment rate to either slow down or speed up the slave clock counter in order to converge towards the master clock.

This is an ongoing process as the Master (804) can periodically send out Sync frames (828) and the Slave (806) can continuously monitor and adjust its slave clock count to keep it synchronized to the master clock count.

Figure 8:
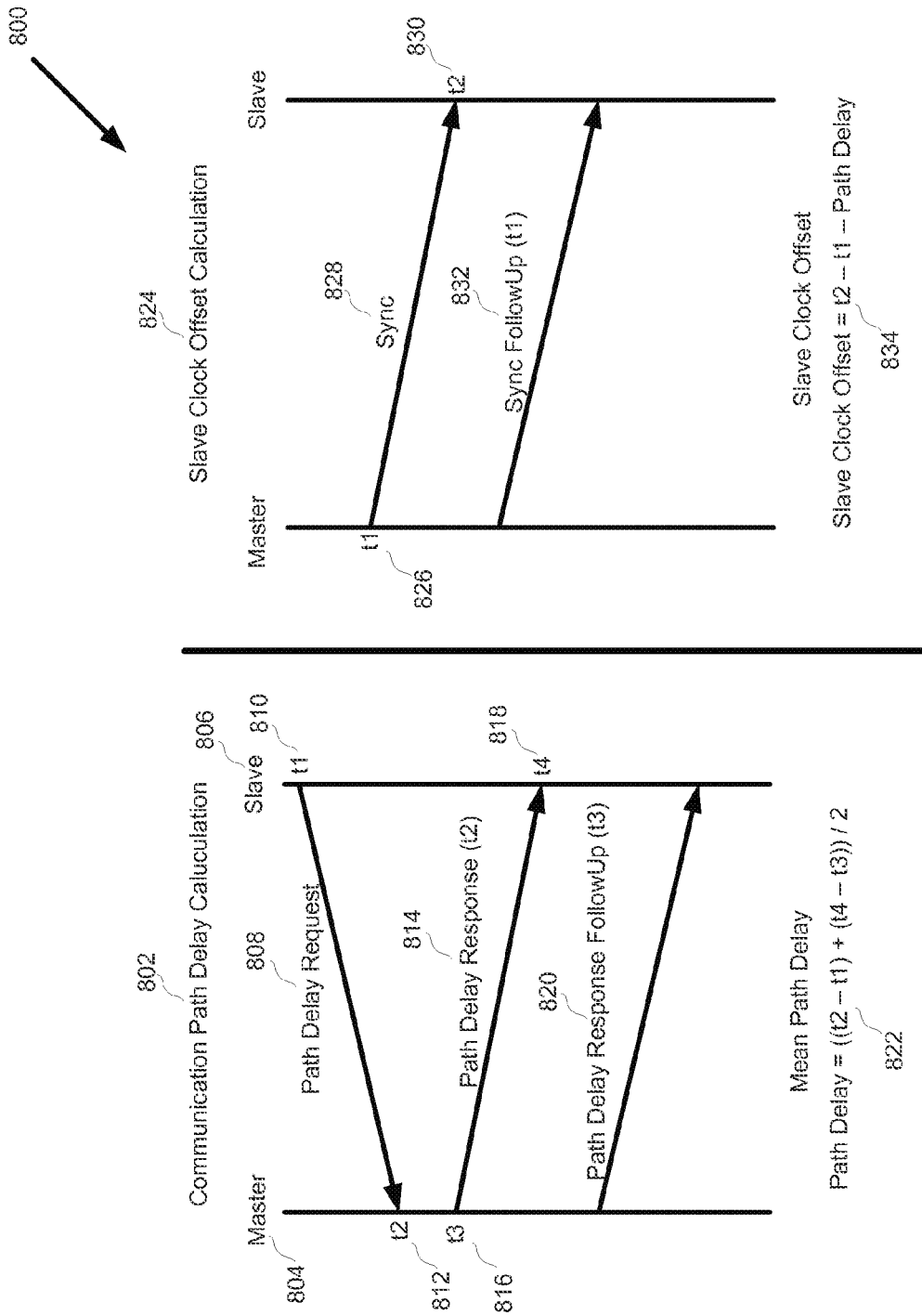
FIG. 8 provides an outline of the Clock synchronization process used in the IEEE 1588 precision time protocol.

Refer to FIG. 8 for an outline of the initial global clock synchronization process as described in the IEEE 1588 specification.

The clock synchronization protocol can also be customized for various applications.

The accuracy of the slave clock time to the master (global) clock time depends on the design. The accuracy can be as little as 1 nanosecond to milliseconds and depends on what the application requires. For lower cost systems the synchronization protocol can be implemented in software and produce synchronization accuracy in the millisecond or microsecond range. For higher end systems or systems that require more accuracy the synchronization protocol can be implemented in hardware and produce synchronization accuracy in the low microsecond or nanosecond range.

Figure 5B:
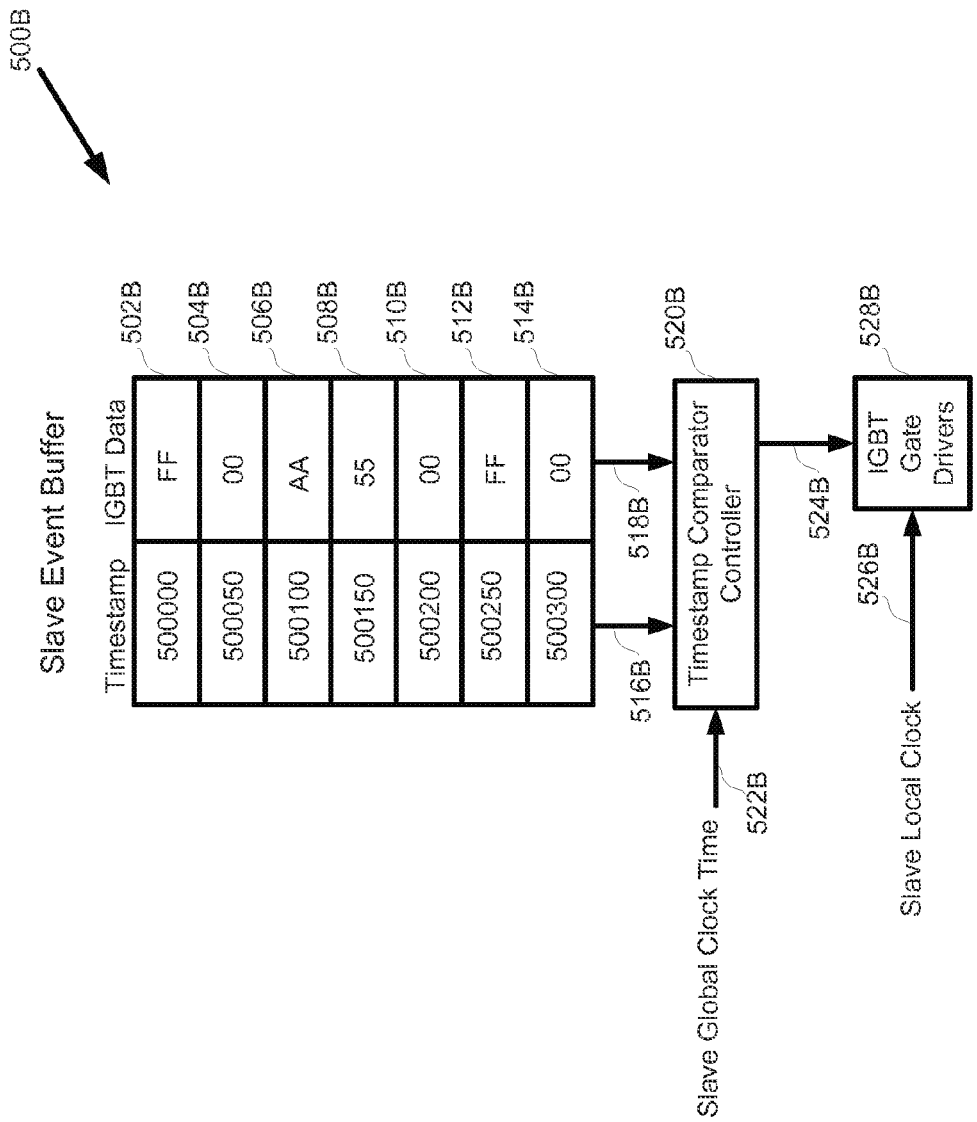

The master (global) clock time in both the master and slave devices can be implemented as a counter which can maintain the seconds and nanoseconds clock counts. This counter represents the global time of the system (both master and slave devices) and this time can be used as the event time. The event time can be used for driving the IGBT's (218), either on or off, using the control data which is sent in the serial interface packets (FIG. 6). The control data which is sent in the packets can be translated into nano or microsecond events (depending on the system accuracy requirements) which can be used to directly drive the IGBT gates (218). This data can be stored in an event buffer and the event buffer output can be triggered by the global clock timestamp. See FIG. 5 for an overview of the master (500A) and slave (500B) event buffer operation and FIG. 11 for a more detailed diagram of the slave event buffer (1102) operation IEEE 1588 Precision Time Protocol.

The IEEE 1588 Precision Time Protocol was developed as a standard for applications where precise control of various pieces of equipment was desired. For example Industrial control applications like factory automation, assembly lines etc. The standard is applicable to any product category with a desired precise time control between multiple pieces of equipment. There are currently two different versions (versions 1 and 2). The latest version (2) included changes to improve the accuracy of the master to slave clock synchronization.

The IEEE 802.1AS Precision Time Protocol is a suitable standard which applies the IEEE 1588 Precision Time Protocol to the field of Audio/Video over Ethernet.

The IEEE 1588 Precision Time protocol can be applied to the field of Power Stack Control Systems which are used in the Wind, Solar, Automotive, Motor Control and Industrial Metals industries. The precise time protocol can be used to accurately control the IGBT drivers and the Error and Status reporting within the Power Stack Control Systems. Such precise time control helps to control the control loop of the power generation and control process.

Serial Interface Packets.

The serial interface packets can contain control data for the Power Stack from the Master Control Unit or status/error information from the Power Stack to the Master Control Unit.

Different packet types can be implemented and these packet types can be modified for various applications and also to provide field updates. Some of the packet types can be used for system control, for example maintaining global clock synchronization between the master and slave devices while other packet types can be used for device control, for example driving IGBT gates, reporting IGBT status etc. Some possible packet types are:

1) Global Clock Synchronization—used to maintain lock between Master and Slave Global Time counters. This packet is specific to the IEEE 1588 Precision Time Protocol spec and cannot transport user data.

2) IGBT Control—used to directly control the Power Stack (s). This can contain Trigger on or off information for each IGBT driver. Refer to FIG. 6 for an example of an IGBT Control packet.

Figure 7:
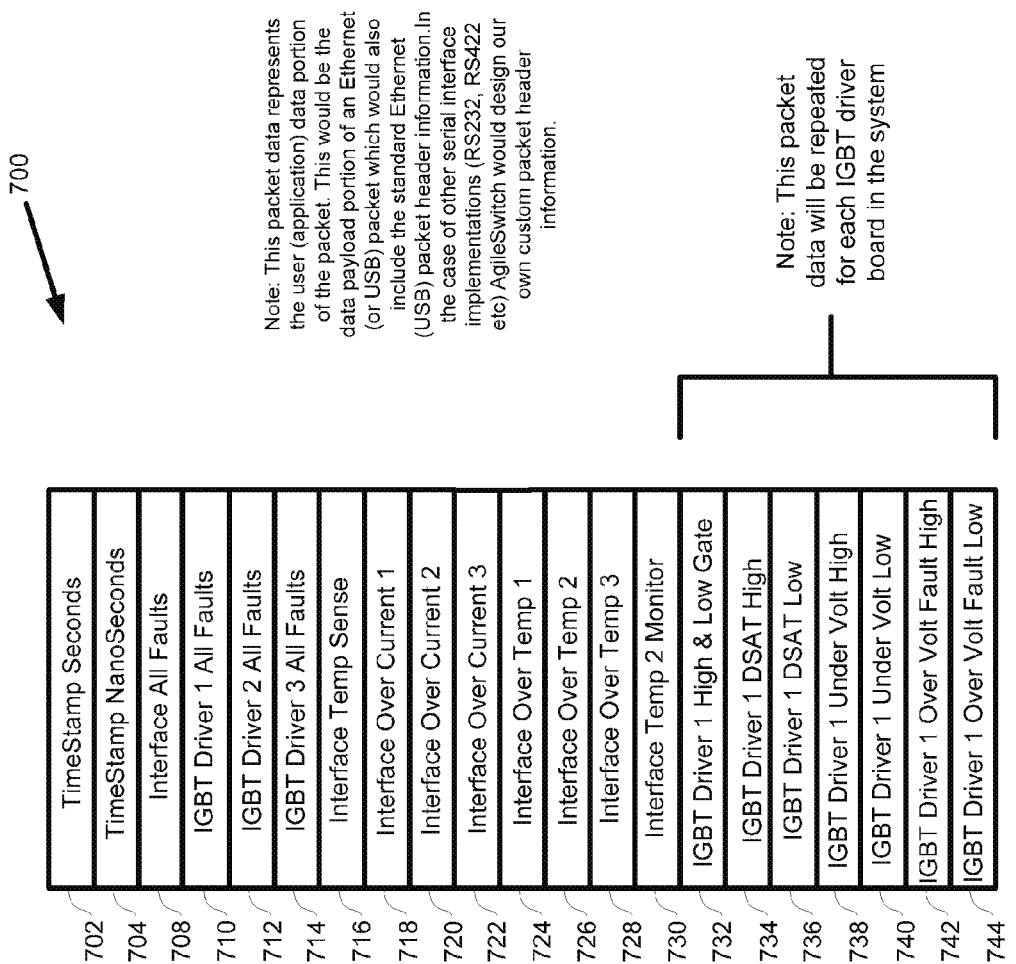
FIG. 7 provides an example of a Status packet. Note: This packet data represents the user (application) data portion of the packet. This would be the data payload portion of an Ethernet (or USB) packet which would also include the standard Ethernet (USB) packet header information. In the case of other serial interface implementations (RS232, RS422 etc.) AgileSwitch would design our own custom packet header information.

3) IGBT Status—used to report IGBT information like temperature measurements. Refer to FIG. 7 for an example of an IGBT Status packet.

Figure 9:
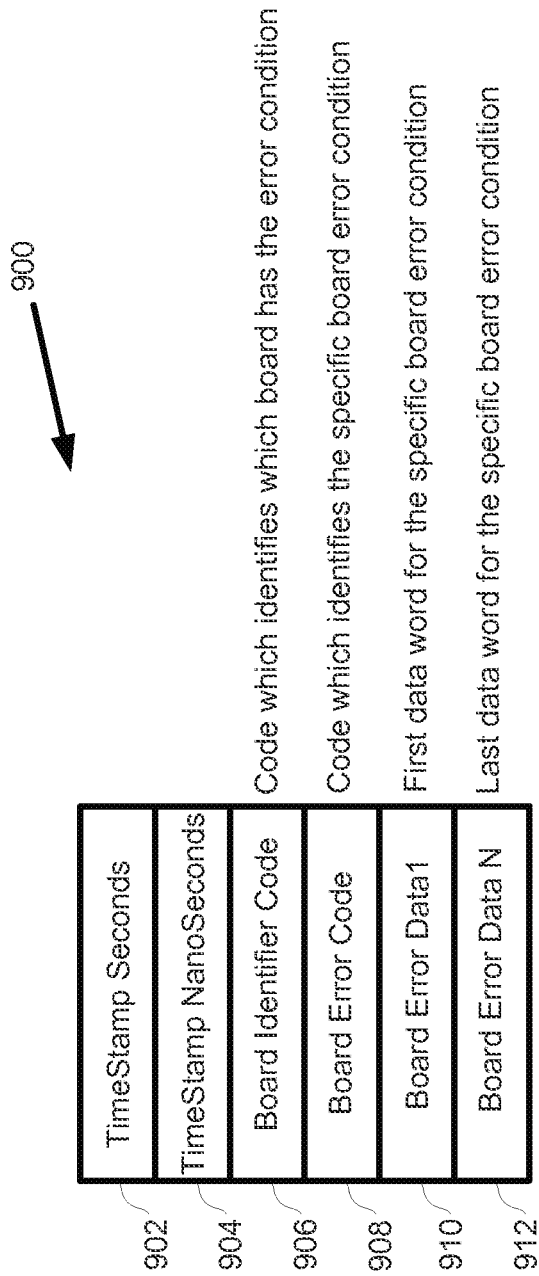
FIG. 9 provides an example of an error packet. Note: This packet data represents the user (application) data portion of the packet. This would be the data payload portion of an Ethernet (or USB) packet which would also include the standard Ethernet (USB) packet header information. In the case of other serial interface implementations (RS232, RS422 etc.) AgileSwitch would design our own custom packet header information.

4) IGBT Error—used to report an IGBT fault condition and the specific IGBT device. For example high temperature fault on a specific IGBT device. Refer to FIG. 9 for an example of an IGBT Error packet.

Figure 10:
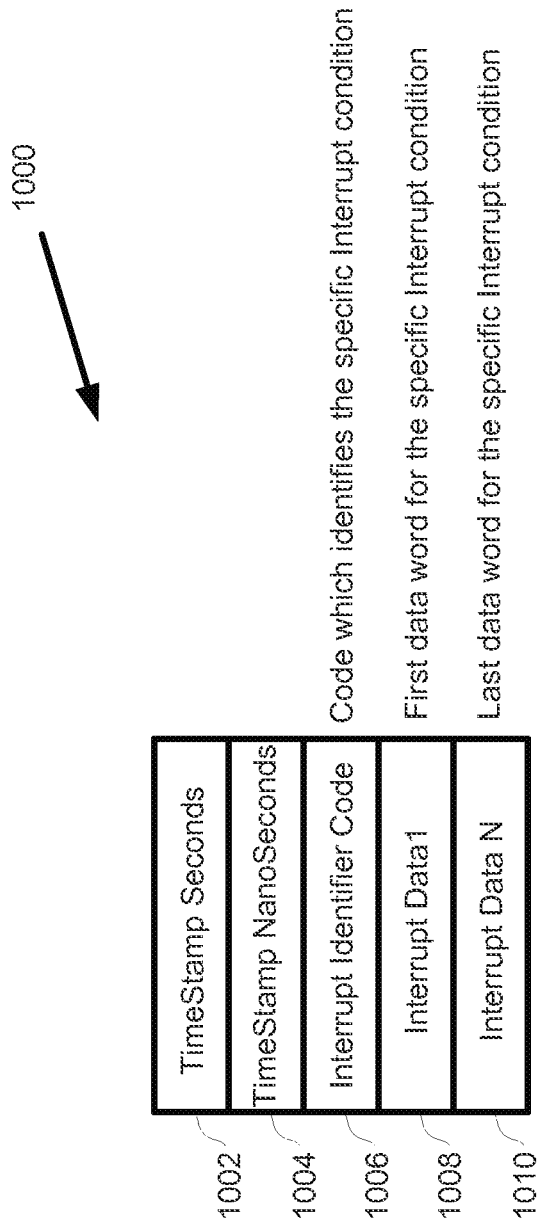
FIG. 10 provides an example of an Interrupt packet. Note: This packet data represents the user (application) data portion of the packet. This would be the data payload portion of an Ethernet (or USB) packet which would also include the standard Ethernet (USB) packet header information. In the case of other serial interface implementations (RS232, RS422 etc.) AgileSwitch would design our own custom packet header information.

5) Interrupt—used to report any high priority information from Master to Slave or Slave to Master that needs immediate attention. For example shut down all IGBT devices. Refer to FIG. 10 for an example of an Interrupt packet.

Serial Interface Packet Rate.

Figure 11:
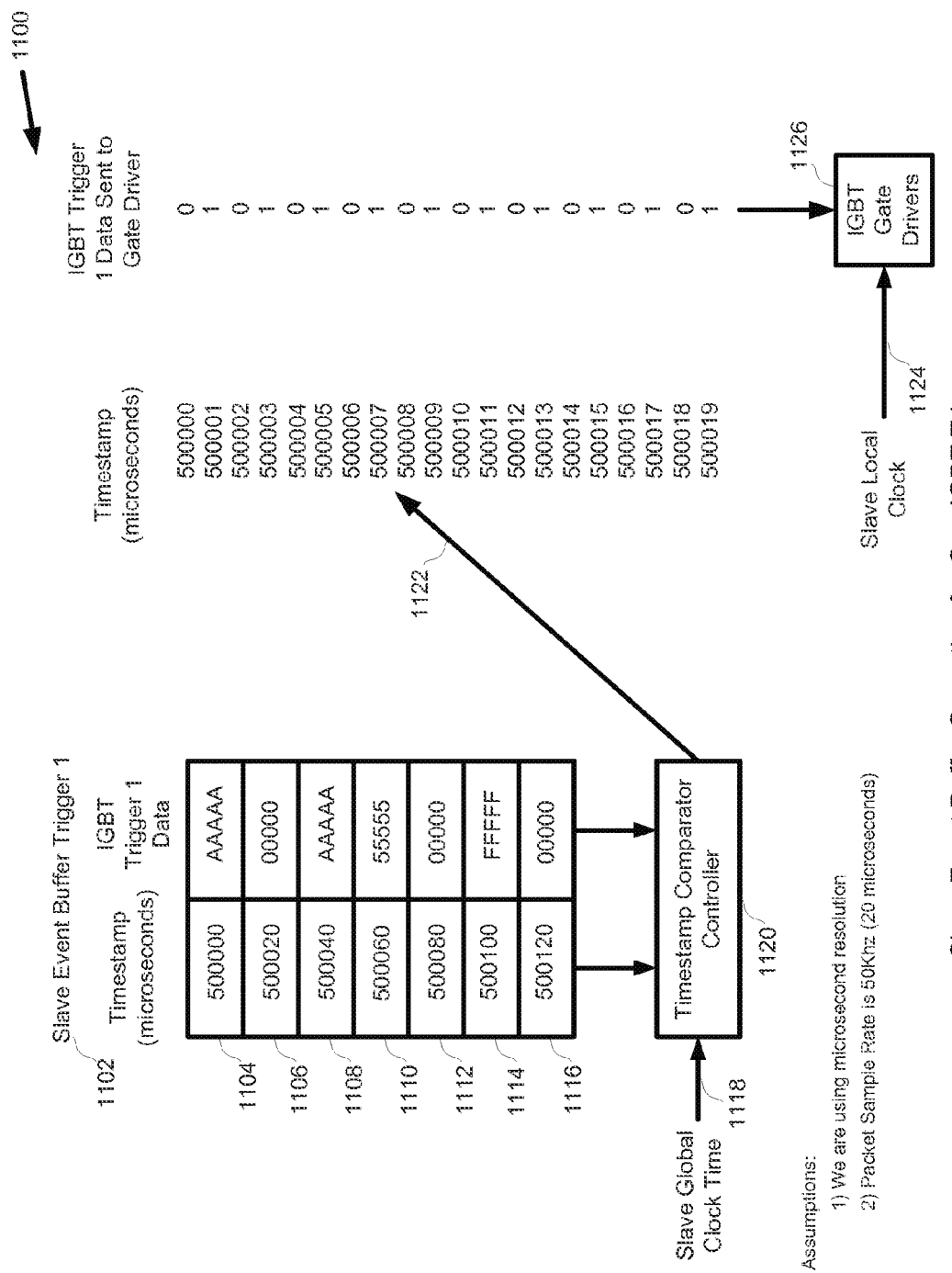
FIG. 11 provides an example of an IGBT Trigger output from a Slave Event buffer based on the global synchronized clock timestamp time.

The Master Control Unit (204) serial interface packets sent for control purposes can be either periodic or variable. Normally these packets can be sent at a fixed sample rate and represent a fixed period of time in which to control the Power Stack. For example the control packets may be sent at a 50 Khz rate (every 20 microseconds) and represent the control data for the Power Stack for a 20 microsecond period based on the timestamp sent within the packet. Within this packet the control information may instruct an IGBT to turn on at time 1 microsecond and off at time 10 microseconds relative to the timestamp sent within the control packet. Refer to FIG. 11 for an example of data for one IGBT trigger as it relates to the timestamp and master (global) clock.

It is also possible for the control data for the Power Stack to represent a longer period of time as it all depends on how the IGBT control data is encoded. This implies that the packets could be sent at a variable sample rate where packets are sent only when changes to the Power Stack are desired to optimize the system performance. As stated above this is all dependent on how the IGBT control data is encoded by the Master Control Unit (204). For example it could be encoded directly using an on/off time slot format or it could be encoded in a non-return to zero format or any other encoding scheme.

The main advantage of a variable packet rate is that it can reduce the bandwidth of the serial interface and free up time which can be used for other purposes.

Basic Calculation Examples for the Serial Interface Packet Rate.

These example calculations provide some general guidelines regarding the time precision which can be achieved for the IGBT triggers when using the clock synchronization protocols over a serial interface cable.

There are a few factors which affect the resolution of the IGBT triggers which are sent in the IGBT Control packets:

Serial Interface Packet Rate—the rate at which the IGBT Control packets are transmitted Serial Protocol—Ethernet, USB, RS232, RS422 etc.

Clock Synchronization Protocol—IEEE 1588

Clock Synchronization Protocol Implementation—software only, hardware/software combination, hardware only For the example calculations we can make the following assumptions:

Use the IEEE 1588 Clock protocol with a hardware only implementation which can support the most accurate master/slave clock alignment.

Ignore any overhead required by the serial protocol—for example Ethernet gap, preamble, header etc. information.

Packet sample rate can be 50 Khz (20 microsecond period)

Use Ethernet and the nominal data rate (i.e., do not factor in the clock tolerance).

Example 1

100 Mbit Ethernet

The nominal packet rate is 100 Mbits a second or 12.5 Mbytes a second.

Sample rate is 50 Khz (20 microseconds)

Total Data Payload bytes per packet=12.5 Mbytes/50 Khz

Total Data Payload bytes per packet=250 bytes

For 6 IGBT triggers this can be about 40 bytes per trigger or 320 bits per trigger Trigger resolution=20 microseconds/320 bits per trigger Trigger resolution=60 nanoseconds (approximately)

Example 2

Gigabit Ethernet

The nominal packet rate is 1000 Mbits a second or 125 Mbytes a second.

Sample rate is 50 Khz (20 microseconds)
Total Data Payload bytes per packet=125 Mbytes/50 Khz
Total Data Payload bytes per packet=2500 bytes
For 6 IGBT triggers this can be about 400 bytes per trigger or 3200 bits per trigger
Trigger resolution=20 microseconds/3200 bits per trigger
Trigger resolution=6 nanoseconds (approximately)
Serial Interface Clock Granularity.

The clock granularity in the system can be dependent on the Serial Interface implementation—for example RS232, RS422, Ethernet, USB and the actual interface hardware chosen. For an Ethernet implementation the clock granularity can be in the 8 to 40 nanosecond range. Preferably clock granularity will be in the 10 to 20 nanosecond range.

When ranges are used herein for physical properties, such as molecular weight, or chemical properties, such as chemical formulae, all combinations, and subcombinations of ranges for specific embodiments therein are intended to be included.

The disclosures of each patent, patent application, and publication cited or described in this document are hereby incorporated herein by reference, in its entirety.

Those skilled in the art will appreciate that numerous changes and modifications can be made to the preferred embodiments of the invention and that such changes and modifications can be made without departing from the spirit of the invention. It is, therefore, intended that the appended claims cover all such equivalent variations as fall within the true spirit and scope of the invention.

What is claimed:

1. A power stack control system, comprising:
a plurality of power stacks; and
a master control unit including:
  a master event buffer including a plurality of entries, each entry indicating a plurality of trigger events far a respective gate bipolar transistor (IGBT) of a respective one of the plurality of power stacks; and
  a serial interface connection, the serial interface connection being in serial electrical communication with a plurality of power stacks, the serial interface connection configured to:
    receive status information packets from the plurality of power stacks and transmit the status information packets to a master control unit,
    receive control packets from the master control unit and transmit the control packets to the plurality of power stacks, wherein each control packet includes the plurality of entries from the master event buffer for the respective IGBT of the respective one of the plurality of power stacks, and
    transmit a master clock signal from the master control unit to the plurality of power stacks,
  each of the plurality of power stacks comprising at least one interface board communicatively connected to the serial interface, the at least one interface board comprising a field programmable gate array (FPGA) and at least one IGBT driver board, the at least one interface board being in parallel communication with at least one IGBT driver board and configured to:
    receive the status information packets from the at least one IGBT driver board and transmit the status information packets to the master control unit,
    receive the control packets from the master control unit and transmit the control packets to the at least one IGBT driver board, and
    transmit the master clock signal from the master control unit to the at least one IGBT driver board; and
  the at least one IGBT driver board being in electrical communication with the respective IGBT, the IGBT driver board including:
    a slave event buffer, wherein the plurality of entries of the master event buffer are stored into the slave event buffer; and
    circuitry configured to cause the respective IGBT to be triggered in as indicated by the slave event buffer entries.

2. The power stack control system of claim 1, further comprising a power cable that provides electric power to at least one power stack.

3. The power stack control system of claim 1, wherein the serial interface connection comprises a serial interface supporting one or more of the following serial interface standards: RS232, RS422, RS485, Ethernet, PCIe, Firewire and USB.

4. The power stack control system of claim 1, wherein the serial interface connection is characterized as being full duplex mode.

5. The power stack control system of claim 1, the plurality of power stacks further comprising at least one IGBT in electrical communication with the at least one IGBT driver board.

6. The power stack control system of claim 1, comprising a plurality of serial interface connections and a plurality of interface boards in a star configuration, wherein each of the serial interface connections is in serial electrical communication with a respective one of the interface boards, wherein each of the interface boards is in parallel communication with a respective IGBT driver board.

7. The power stack control system of claim 1, wherein the serial interface connection supports varying serial data packet structures for control information sent by the master control unit to one or more of the power stacks.

8. The power stack control system of claim 7, wherein the varying serial data packet structures encode status/error information sent by one or more of the power stacks to a master control unit.

9. The power stack control system of claim 8, wherein the varying serial data packet structures are transmitted at fixed sample rates, or variable sample rates, or both by the master control unit.

10. The power stack control system of claim 1, wherein the serial interface connection supports varying serial data packet structures for control information sent by the master control unit to one or more of the power stacks.

11. The power stack control system of claim 10, wherein the varying serial data packet structures encode status/error information sent by any one of the power stacks to the master control unit.

12. The power stack control system of claim 11, wherein the varying serial data packet structures are transmitted at fixed sample rates, or variable sample rates, or both by the master control unit to the one or more power stacks.

13. The power stack control system of claim 1, wherein at least one of the plurality of power stacks is configured to log data to support failure analysis of a respective power stack, or preemptive maintenance for a potentially failing power stack, or both.

14. The power stack control system of claim 1, wherein the at least one interface board provides a real time communication interface with the master control unit.

15. The power stack control system of claim 1, wherein the serial interface is configured to be connected to a network to provide remote access to a user to control, to monitor the status of, or both, one or more of the power stacks or the entire power stack control system.

16. The power stack control system of claim 15, wherein the network comprises a local area network (LAN), a wide area network (WAN), or the Internet.

17. The power stack control system of claim 15, wherein the serial interface connects to the network wirelessly, wired, or optically.

18. The power stack control system of claim 1, wherein the respective interface boards of the plurality of power stacks are connected in a daisy-chain with the master control unit such that the interface board of a first one of the plurality of power stacks in the daisy chain is in electrical communication with the serial interface connection of the master control unit and the interface board of a last one of the plurality of power stacks in the daisy chain is in electrical communication with the serial interface connection of the master control unit.

* * * * *